(12) United States Patent
Hannig

(10) Patent No.: US 10,479,134 B2
(45) Date of Patent: *Nov. 19, 2019

(54) METHOD FOR PRODUCING A DECORATED WALL OR FLOOR PANEL

(71) Applicant: AKZENTA PANEELE + PROFILE GMBH, Kaisersesch (DE)

(72) Inventor: Hans-Juergen Hannig, Bergisch Gladbach (DE)

(73) Assignee: AKZENTA PANEELE + PROFILE GMBH, Kaisersesch (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/310,017

(22) PCT Filed: Apr. 28, 2015

(86) PCT No.: PCT/EP2015/059220
§ 371 (c)(1),
(2) Date: Nov. 9, 2016

(87) PCT Pub. No.: WO2015/169647
PCT Pub. Date: Nov. 12, 2015

(65) Prior Publication Data
US 2017/0157977 A1 Jun. 8, 2017

(30) Foreign Application Priority Data
May 9, 2014 (EP) ..................... 14167698

(51) Int. Cl.
*B29C 43/22* (2006.01)
*B44C 5/04* (2006.01)
(Continued)

(52) U.S. Cl.
CPC .............. *B44C 5/04* (2013.01); *B27N 3/24* (2013.01); *E04F 13/00* (2013.01); *B32B 2471/00* (2013.01)

(58) Field of Classification Search
CPC .. B44C 5/04; B27N 3/24; B27N 7/005; B29C 43/22; B29C 43/48; B30B 5/06; E04F 13/00; E04F 15/102
See application file for complete search history.

(56) References Cited

U.S. PATENT DOCUMENTS 2,993,523 A * 7/1961 Monaco ................ B29C 70/504
156/381
5,529,812 A 6/1996 Keding
(Continued)

FOREIGN PATENT DOCUMENTS

CN  86105159 A  2/1987
DE  2113763 A1  9/1972
(Continued)

OTHER PUBLICATIONS

Herman Van Dyk, Determination of Wood Panel Uniformity by Means of Optical Sensor Technology, 2010 (Year: 2010).*

Primary Examiner — Xiao S Zhao
Assistant Examiner — Asha A Thomas
(74) Attorney, Agent, or Firm — Harness, Dickey & Pierce, P.L.C.

(57) ABSTRACT

A method for producing a decorated wall or floor panel comprises providing a pourable carrier material, placing the carrier material between two belt-like conveying means, forming the carrier material under the action of temperature to form a web-shaped carrier, compressing the carrier, treating the carrier under action of pressure using a twin belt press, wherein the carrier is cooled within or upstream of the twin belt press, optionally cooling the carrier, optionally applying a decorative subsurface onto at least a portion of the carrier, applying a decoration reproducing a decorative template onto at least a portion of the carrier, applying a protective layer onto at least a portion of the decoration, optionally structuring the protective layer in order to intro-
(Continued)

Figure 1:
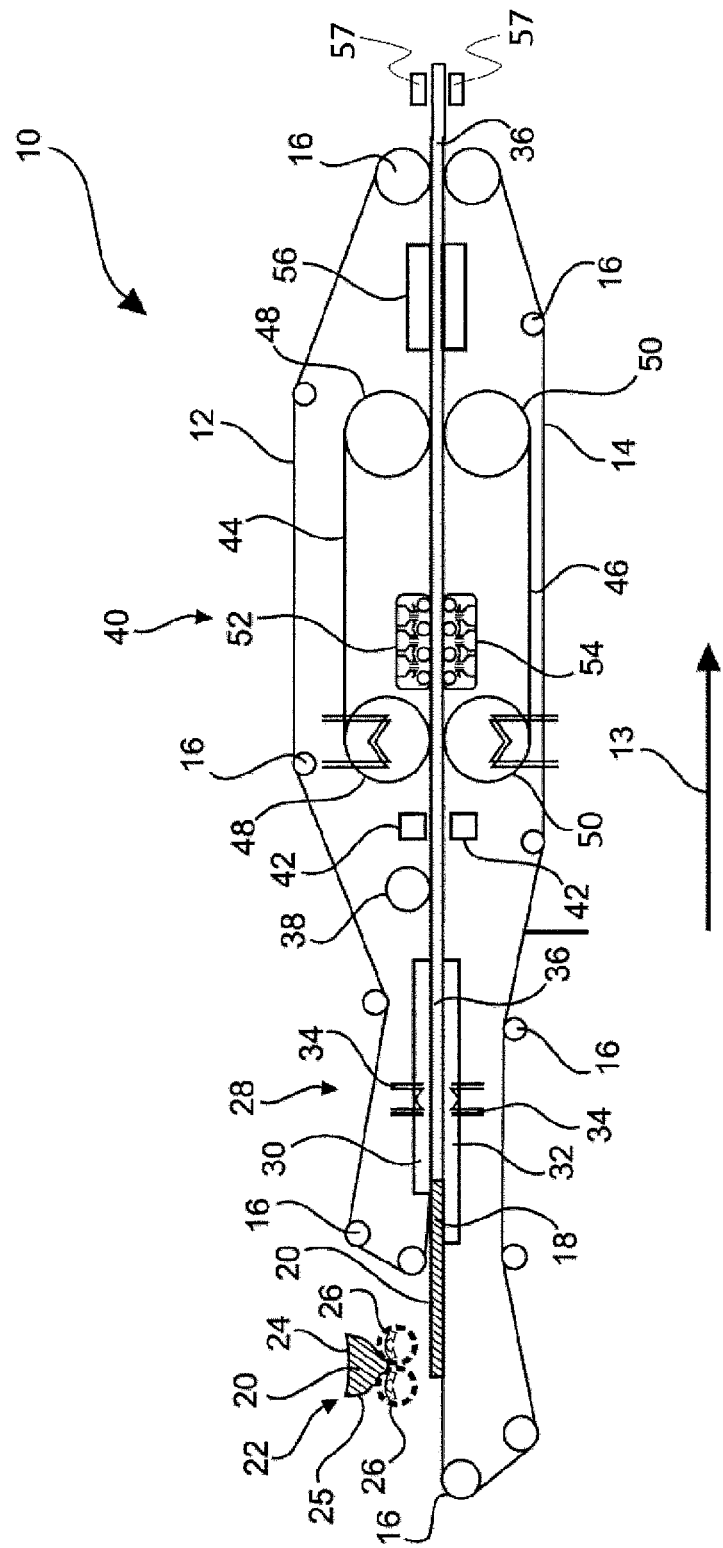

duce pores and/or the edge region of the carrier in order to form connecting elements, and optionally treating the carrier for electrostatic discharge prior to any one of the above steps.

13 Claims, 2 Drawing Sheets

(51) Int. Cl.
  *B27N 3/24* (2006.01)
  *E04F 13/00* (2006.01)

(56) References Cited

U.S. PATENT DOCUMENTS

| | | | |
|---|---|---|---|
| 6,569,272 | B2 | 5/2003 | Tychsen |
| 8,110,132 | B2 * | 2/2012 | Kimberly ............... B29C 59/04 156/62.2 |
| 2003/0138618 | A1 | 7/2003 | Courtoy et al. |
| 2003/0207083 | A1 | 11/2003 | Hansson et al. |
| 2004/0094262 | A1 * | 5/2004 | Canti ...................... B05D 1/42 156/231 |
| 2006/0230358 | A1 | 10/2006 | Sacher et al. |
| 2007/0175912 | A1 | 8/2007 | Uehara et al. |
| 2008/0311299 | A1 | 12/2008 | Furukawa |
| 2009/0145066 | A1 | 6/2009 | Pervan et al. |
| 2009/0202810 | A1 | 8/2009 | Kimberly |
| 2010/0055420 | A1 | 3/2010 | Vermeulen |
| 2012/0183784 | A1 | 7/2012 | Russell |

FOREIGN PATENT DOCUMENTS

| | | | | |
|---|---|---|---|---|
| DE | 19842510 | A1 | 3/2000 | |
| DE | 10205894 | A1 | 8/2003 | |
| EP | 1153747 | A2 | 11/2001 | |
| EP | 1842661 | A1 | 10/2007 | |
| EP | 1905600 | A2 | 4/2008 | |
| EP | 2402174 | A1 | 1/2012 | |
| GB | 2324982 | A | 11/1998 | |
| JP | H04235158 | A | 8/1992 | |
| JP | H09-216209 | A | 8/1997 | |
| JP | H09290409 | A | 11/1997 | |
| JP | H10-166321 | A | 6/1998 | |
| JP | H11-333983 | A | 12/1999 | |
| JP | 2001246606 | A | 9/2001 | |
| JP | 2009154037 | A | 7/2009 | |
| JP | 2010-162784 | A | 7/2010 | |
| JP | 2011522138 | A | 7/2011 | |
| WO | WO-0148333 | A1 | 7/2001 | |
| WO | WO-0228665 | A1 | 4/2002 | |
| WO | WO-2002/076697 | A1 | 10/2002 | |
| WO | WO-2002094523 | A1 | 11/2002 | |
| WO | WO-2007061193 | A1 | 5/2007 | |
| WO | WO-2008061791 | A1 | 5/2008 | |
| WO | 2008122668 | A1 | 10/2008 | |
| WO | WO-2009065769 | A2 * | 5/2009 | ............ B32B 21/02 |
| WO | WO-2015/011049 | A1 | 1/2015 | |

* cited by examiner

METHOD FOR PRODUCING A DECORATED WALL OR FLOOR PANEL

CROSS-REFERENCE TO RELATED APPLICATIONS

This application is a National Stage of International Application No. PCT/EP2015/059220, filed on Apr. 28, 2015, and published in German as WO 2015/169647 A1 on Nov. 12, 2015. This application claims the priority to European Patent Application No. 14167698.1, filed on May 9, 2014. The entire disclosures of the above applications are incorporated herein by reference.

FIELD

The present disclosure relates to a method for producing a decorated wall or floor panel and a wall or floor panel produced according to such a method.

BACKGROUND

This section provides background information related to the present disclosure which is not necessarily prior art.

Decorated plates are known per se, wherein the term wall panel also means panels, which are suitable for ceiling linings. They usually consist of a carrier or a core of a solid material such as a wood-based material, which on at least one side is provided with a decorative layer and a top layer and optionally with further layers, for example a wearing layer disposed between the decorative layer and the top layer. The decorative layer is usually a printed paper which is impregnated with a resin. The top layer and the other layers are usually made of resin.

Herein, the production of the panels such as the core or the carrier, possibly offers further room for improvements.

SUMMARY

This section provides a general summary of the disclosure, and is not a comprehensive disclosure of its full scope or all of its features.

It is therefore the object of the present disclosure to provide an improved method for producing decorated wall or floor panels.

The disclosure thus proposes a method for producing a decorated wall or floor panel, comprising the steps of:
a) providing a pourable carrier material, in particular a granulate,
b) placing the carrier material between two belt-like conveying means,
c) forming the carrier material under the influence of temperature to form a web-shaped carrier,
d) compressing the carrier,
e) treating the carrier under the influence of pressure with use of a twin belt press, wherein the carrier is cooled within or upstream of the twin belt press,
f) optionally further cooling the carrier,
g) optionally applying a decorative subsurface onto at least a portion of the carrier,
h) applying a decoration reproducing a decorative template onto at least a portion of the carrier,
i) applying a protective layer onto at least a portion of the decoration,
j) optionally structuring the protective layer for introducing pores and/or the edge region of the carrier in order to form connecting elements, and
k) optionally treating the carrier for electrostatic discharge prior to any of the above steps.

The term "decorated wall or floor panel" or "decorative panel" in the sense of the disclosure means in particular wall, ceiling or floor panels comprising a decoration reproducing a decorative template applied onto a carrier plate. Decorative panels are used in a variety of ways both in the field of interior design of rooms and for decorative claddings of buildings, for example in exhibition stand construction. One of the most common application fields of decorative panels is their use as a floor covering. Herein, the decorative panels often comprise a decoration intended to replicate a natural material.

Examples of such replicated natural materials or decorative templates are wood species such as maple, oak, birch, cherry, ash, walnut, chestnut, wenge or even exotic woods such as Panga Panga, mahogany, bamboo and bubinga. In addition, often natural materials such as stone surfaces or ceramic surfaces are replicated.

Accordingly, a "decorative template" in the sense of the present disclosure may be understood as an original natural material or at least a surface of such a material which is to be imitated or replicated by the decoration.

A "pourable" material can be understood in particular as a material, which can be applied by a pouring process or a scattering process onto a subsurface. Herein, the material may be provided as a fluid or in particular as a pourable solid.

"Granules" or a "granular material" means a solid or a head of a solid which comprises or consists of a plurality of solid particles, such as grains or beads. By way of example but not limited thereto grainy or powdered materials may be mentioned here.

A "carrier" can in particular be understood as a layer serving as a core or as a base layer in a finished panel which in particular may comprise a natural material, such as a wood-based material, a fiber material or a material comprising a plastic. For example, the carrier may already impart or contribute to a suitable stability for the panel.

A "web-shaped carrier" may be understood as a carrier which in its manufacturing process has a web-shaped structure and thus a length which is considerably greater compared to its thickness or width, wherein its length may be, for example, greater than 15 meters.

The term "plate-shaped carriers" in the sense of the present disclosure may be understood as a carrier, which is formed from the web-shaped carrier by separation and is formed in the shape of a plate. The plate-shaped carrier may already define the shape and/or size of the panel to be produced. However, the plate-shaped carrier can also be provided as a large plate. A large plate in the sense of the disclosure is in particular a carrier whose dimensions several times exceed the dimensions of the final decorative panels, and which in the course of the manufacturing process is separated in a corresponding plurality of decorative panels, for example by sawing, laser or water jet cutting. For example, the large plate may correspond to the web-shaped carrier.

Wood-based materials in the sense of the disclosure in addition to solid wood materials are materials such as cross-laminated timber, glue-laminated timber, blockboard, veneered plywood, laminated veneer lumber, parallel strand lumber and bending plywood. In addition, wood-based materials in the sense of the disclosure are also chipboards such as pressboards, extruded boards, oriented structural boards (OSB) and laminated strand lumber as well as wood fiber materials such as wood fiber insulation boards (HFD), medium hard and hard fiberboards (MB, HFH) and in particular medium density fiberboards (MDF) and high density fiberboards (HDF). Even modern wood-based materials such as wood polymer materials (wood plastic composite, WPC), sandwich boards made of a lightweight core material such as foam, rigid foam or honeycomb paper and a layer of wood applied thereto, and minerally hardened, for example with cement, chipboards are wood-based materials in the sense of the disclosure. Moreover, cork represents a wood-based material in the sense of the disclosure.

In the sense of the disclosure the term "fiber materials" means materials such as paper and non-woven fabrics on the basis of plant, animal, mineral or even synthetic fibers as well as cardboards. Examples of fiber materials on the basis of plant fibers in addition to papers and non-woven fabrics made of cellulose fibers are boards made of biomass such as straw, maize straw, bamboo, leaves, algae extracts, hemp, cotton or oil palm fibers. Examples of animal fiber materials are keratin-based materials such as wool or horsehair. Examples of mineral fiber materials are mineral wool or glass wool.

It could surprisingly be shown that the method described above enables the combination of a particularly advantageous manufacturing in particular of a carrier of a wall or floor panel with materials which are particularly preferred for producing the carrier of the panel due to their outstanding properties. Thus, by combining the above-described method steps, a manufacturing method in particular of a carrier with outstanding materials of a decorated wall or floor panel is enabled with an increased efficiency, wherein the method, moreover, enables the production of highly adaptable and very stable panels. Thus, panels may produced in a simple way, which may have preferred properties.

The method for producing a wall or floor panel comprises the following method steps.

First, in accordance with the present method a carrier or a core is produced. To this end, the method described above comprises according to method step a) initially providing a pourable carrier material. The carrier material serves as a basis for the production of in particular plate-shaped carriers for panels. It may, for example, be provided as a homogeneous material or as a mixed material of two or more materials. The carrier material or at least a component of the carrier material should have a melting point or a softening point, in order to form the carrier material in a further method step by the action of heat, as is explained in detail below. In a particularly advantageous manner the carrier material can be provided as a pourable solid or as granules, wherein the granules depending on the material used may have a particle size in the range of $\geq 100$ μm to $\leq 10$ mm by way of example only. This allows for easy storage and also enables a particularly good adaptability to a desired material composition. In particular in granular form a particularly homogeneous mixture of different components may be produced, wherein a particularly defined mixture with an accurately settable composition can be obtained. By way of example so-called dry blends can be used, i.e. dry plastic powders with additives. In addition, granules may in particular in the above size range may be distributed very uniformly and also very defined on a subsurface such that a carrier with a highly defined property profile can be produced. Herein, a preferred fill or distribution of the carrier material can have a deviation of the bulk density of $\leq 5\%$, in particular $\leq 3\%$.

According to method step b) the pourable, in particular granular carrier material is disposed between two belt-like conveying means. In detail, a lower belt-like conveying means is moved circumferentially and an upper belt-like conveying means is circumferentially moved at a defined distance from the lower conveying means. Thus, the carrier material can be applied onto the lower conveying means and subsequently be confined by the lower and the upper conveying means. By means of an exact scattering process a lateral boundary can be dispensed with. By means of the two conveying means the carrier material can be transferred to or through individual processing stations and processed into a carrier. Furthermore, the carrier material can already be preformed in this method step. Thus, the belt-like conveying means may have two functions, namely that of a transport means and that of a mold.

The belt-like conveying means at least in the region of the twin belt press may, as described below, at least partially be made of Teflon or polytetrafluoroethylene (PTFE). For example, the belts can be formed entirely of polytetrafluoroethylene, or belts may be used which are provided with an outer layer of polytetrafluoroethylene. In the latter case, for example, glass fiber reinforced plastic belts or steel belts can be used. By this kind of conveying means due to the anti-adhesion properties of this material particularly defined, for example, smooth surface of the produced carrier may be obtained. Thus, it can be prevented that the conveyed carrier material adheres to the conveying means and so adversely affects the surface structure directly or by adherent material in a next cycle. In addition polyterafluorethylen even at high temperatures is resistant against chemicals as well as against decomposition, so that on the one hand a temperature treatment of the carrier material is possible without any problems and on the other hand the conveying means are also stable for a long period. In addition, the material may be freely selected.

Herein, the conveying means may pass the entire apparatus or may be interrupted and configured as a plurality of conveying means.

The dispense of the carrier material according to method step b) may in particular be realized by means of a plurality of scattering heads, which are adapted to dispense the carrier material in a defined way. With respect to the scattering heads these for example may be part of a scattering aggregate and include at least one rotating scattering roller. For example, a hopper may be provided which can dispense the material to be dispensed onto the scattering roller in a defined way. In this case, a doctor blade may further be provided which sweeps the material into recesses of the roller. Subsequently the material can be dispensed from the scattering roller by use of a rotating brush roll, wherein it hits against a baffle and slides from there onto the conveying means. In order to control the scattering width further a scattering width adjustment may be provided. In this embodiment, a particularly homogeneous dispense of the carrier material may be realized, which accordingly leads to a homogeneous carrier of defined quality.

For example one scattering head or two, three or more scattering heads may be provided. As a result, the carrier can be particularly tailored in a particularly simple way, for example by providing a desired mixture of materials. In this embodiment, the mixture can be easily adjusted during the manufacturing process or between two charges such that a particularly great variability can be ensured. In addition, by different equipping the individual scattering heads a mixture of the carrier material may be produced immediately prior to the processing such that an adverse effect of the various components with respect to each other and a consequent reduction in quality of the produced carrier can be prevented.

In a further step according to method step c) the carrier material arranged between the belt-like conveying means is formed under the influence of temperature or heat. In this method step due to thermal energy or heat acting on the carrier material the carrier material or at least part thereof is melted or softened, whereby, for example, the granules may become moldable. In this state it may homogeneously fill the accommodating space formed between the conveying means and thus form a web-shaped carrier, which can be further treated.

The thus formed web-shaped carrier can be compressed simultaneously with or subsequently to method step d). This method step may be implemented in particular in a suitable press or roller. Thus, here a first compression of the the web-shaped carrier takes place. In this step, the carrier substantially can already obtain a desired thickness so that in following processing steps only a slight compression needs to be carried out and thus the further steps may be implemented very gently, as will be explained in detail below. Herein, in particular, it can be ensured that the temperature of the carrier is cooled down sufficiently such that a suitable compressibility is enabled while maintaining the desired result.

In a further method step e) now a further treatment of the carrier under the influence of pressure with use of a twin belt press is implemented. In this method step, in particular the surface properties of the carrier can be adjusted. For example, in this method step in particular a smoothing of the surface can take place. To this end, the previously compressed carrier can be treated under the influence of pressure, wherein in particular a low pressure can be selected such that this second compression takes place only in a very small area. By way of example, a compression can be carried out in a range of ≤10%, ≤5%, in particular ≤3% of the total thickness of the carrier prior to the compression. For example, a compression can be carried out in a range of 0.2 mm to 0.3 mm at a plate thickness of 4.5 mm. Thus, the design of the processing device in this method step can be selected in particular depending on a desired adjustment of the surface properties, which may be particularly gently. Thus, the twin belt press may serve as a calibration zone in particular for adjusting the final surface properties as well as the thickness of the carrier.

Here, in particular the use of a twin belt press can be advantageous, since with such a press particularly gentle compression steps are possible and moreover the surface quality can be set particularly effective and defined. Further, in particular the use of a belt press enables high line speeds such that the whole process enables a particular high throughput.

For example, such a belt press, which usually has a fairly long processing room in the conveying direction of the carrier, may comprise a plurality of tempering zones, which allows a temperature profile and, therefore, an effective adjustment of the surface properties even at high line speeds.

In addition, by providing pneumatic cylinders a particularly uniform and defined adjustable belt tension of the twin belt press is enabled such that the adjustment of the surface quality as well as the compression may be extremely accurate. The belt press can include steel belts, for example, without a coating or with a polytetrafluoroethylene coating, and/or may be temperature controlled by means of a thermal oil heater.

A smoothing or adjustment of the surface quality in this step can mean that while the top surface is smoothed already introduced structures or pores, if any, are not affected or are only affected in a defined area such that they are present in a desired extent even after that step. This can in particular be enabled by the use of a belt press with a suitable temperature profile and with suitable pressure values.

Herein it is further provided that the carrier upstream of or within the twin belt press and, thus, in particular during or prior to method step e) is cooled, in particular below the melting point or softening point of a plastic component of the carrier material. Herein, a cooling process may be implemented only within a restricted area such that the carrier actually has an increased temperature compared to room temperature (22° C.), however is below the previously set increased temperature and, thus, preferably and depending on the plastic material used below the melting point or the softening point of the plastic component included in the carrier material. This, for example, may be realized by an appropriate selection of the temperature of the tempering means which are disposed in the twin belt press, or the carrier may in particular be cooled or heated to a lower extent by tempering means located upstream of the twin belt press. In particular, by cooling the carrier a particular high quality surface image can be produced since the belts of the twin belt press which for example may be made of polytetrafluoroethylene (Teflon) experience less stress. Moreover, cupping or the presence of blowholes or pores can be avoided such that the surface of the carrier can be of particularly high quality. Suitable temperatures for polyethylene, for example, are in the range of below 130° C., such as in a range of ≥80° C. to ≤115° C., such as 120°, without being restricted thereto.

In the further progress in a further method step f) then optionally a further cooling process of the web-shaped carrier is carried out. The carrier may in particular be cooled down by providing a cooling means with defined cooling stages to a temperature corresponding to the room temperature or, for example, in a range of up to 2000 thereabove. For example, a plurality of cooling zones may be present in order to enable a defined cooling of the carrier.

After cooling the carrier produced the carrier may be stored in a web-shaped form or as separated plate-shaped carriers and the process can momentarily be stopped. Preferably, however, further processing steps immediately follow which, for example, can be realized without grinding, in particular to process the provided carrier in order to produce a finished panel, as explained in detail below.

For producing a finished panel, the method comprises the following further method steps in order to provide the carrier with a decoration and to coat this decoration with a protective layer. Herein, the subsequent steps are preferably carried out directly with the produced web-shaped carrier. However, the disclosure also includes that the web-shaped carrier is divided into a plurality of plate-shaped carriers prior to one of the method steps g) to j) and/or the plate-shaped carrier is treated further by the corresponding subsequent method steps. The following explanations apply for both alternatives accordingly, wherein in the following for simplification it is referred to a treatment of the carrier.

According to method step k) thus optionally first a pre-treatment of the carrier for electrostatic discharge can take place prior to method step g). This can in particular serve to prevent the occurrence of blurring in the course of the application of the decoration. This is particularly suitable for printing processes for applying the decorative layers, because electrostatic charges building up in the carriers to be printed in the course of the production process lead to a deflection of paint or ink droplets on their way from the print head to the surface to be printed. The thus induced inaccuracy of the paint coating leads to the perceivable blurring of the printing image.

The device for discharging electrostatic charges may include at least one roller, brush or lip of a conductive material having a conductivity ≥1*103 Sm−1, which electrically contacts the carrier at least in the region of the printing mechanism and which is connected to an electrical ground potential. In this case, the electrical ground potential can be provided for example by a grounding. Further, a device for discharging electrostatic charges may for example comprise a means for generating a corona discharge.

According to method step g) further optionally a decoration subsurface may be applied to at least a portion of the carrier. For example, first a primer in particular for printing processes may be applied as a decoration subsurface for example in a thickness of ≥10 μm to ≤60 μm. In this case, as a primer a liquid radiation curable mixture based on a urethane or a urethane acrylate, optionally with one or more of a photoinitiator, a reactive diluent, a UV stabilizer, a rheological agent such as a thickener, radical scavengers, leveling agents, antifoams or preservatives, pigment, and/or a dye may be used. For example, the urethane acrylate in the form of reactive oligomers or prepolymers may be included in the primer composition. The term "reactive oligomer" or "prepolymer" in the sense of the disclosure is a compound comprising urethane acrylate units which is able to react radiation induced, optionally with addition of a reactive binder or a reactive diluent, to urethane polymer or urethane acrylate polymer. Urethane acrylates in the sense of the disclosure are compounds which are composed essentially of one or more aliphatic structural elements and urethane groups. Aliphatic structural elements include both alkylene groups, preferably having 4 to 10 carbon atoms, and cycloalkylene groups having preferably 6 to 20 carbon atoms. Both the alkylene and the cycloalkylene groups may be mono- or poly-substituted with C1-C4 alkyl, in particular methyl, and include one or more non-adjacent oxygen atoms. The aliphatic structural elements are optionally quaternary or tertiary carbon atoms bonded to each other via urea groups, biuret, uretdione, allophanate, cyanurate, urethane, ester or amide groups or via ether oxygen or amine nitrogen. Furthermore, urethane acrylates in the sense of the disclosure may also include ethylenically unsaturated structural elements. In this case, they preferably are vinyl or allyl groups, which may also be substituted with C1-C4 alkyl, in particular methyl, and which are derived in particular from α, β-ethylenically unsaturated carboxylic acids or their amides. Particularly preferred ethylenically unsaturated structural units are acryloyl and methacryloyl groups such as acrylamido and methacrylamido and in particular acryloxy and methacryloxy. Radiation curable in the sense of the disclosure means that the primer composition may be at least partially polymerized induced by electromagnetic radiation of a suitable wavelength, such as ultraviolet radiation or electron radiation.

The use of radiation curable primers based on urethane acrylates allows in a particularly advantageous manner an application of a decoration immediately subsequent to the application and the radiation induced curing of the primer layer for example by means of digital printing technology. The primer layer provides for good adhesion of the applied decoration to the carrier surface coated with the primer. Herein, urethane acrylates have the advantage of good adhesion to both the carrier material and the decorative layer, i.e. the decorative paint or ink. This is based inter alia on the polymerization reactions occurring in this type of polymers, in which on the one hand a radiation induced radical polymerization of the OH groups occurs, and on the other hand a post curing of the polymer via the NCO groups occurs. This results in that after the radiation induced curing immediately a tack-free and further processable surface is obtained, while the final properties of the primer layer are also influenced by the post curing based on NCO groups and provide for a secure bond to the carrier material. In addition, the occurring post curing ensures that a sufficient layer stability is achieved even in less or non-exposed areas of the carrier. Thus, the method according to the disclosure enables to provide in particular pre-structured carriers, i.e. carriers whose surface already have a three-dimensional structure, reliably with a primer layer, such it is ensured that the subsequently applied decoration is firmly adhesively connected to the carrier.

Preferably, in the method according to the disclosure the primer can be applied onto the carrier plate by means of rubber rollers, a pouring machine or by spraying. Preferably, the primer is applied in an amount between ≥1 g/m2 and ≤100 g/m2, preferably between ≥10 g/m2 and ≤50 g/m2, in particular between ≥20 g/m2 and ≤40 g/m2. Subsequently to the application of the primer onto the carrier surface an irradiation by use of a radiation source of an appropriate wavelength is carried out.

In addition to the use of a primer it is possible to apply the decoration onto a decorative paper printable with a corresponding decoration, which may be provided for example by means of a resin layer as bonding agent previously applied to the carrier. Such a printing subsurface is suitable for flexographic printing, offset printing or screen printing processes and particularly for digital printing techniques such as inkjet processes or laser printing processes. For the application of the resin layer it may be preferably provided that a resin composition is applied which as a resin component includes at least one compound selected from the group consisting of melamine resin, formaldehyde resin, urea resin, phenol resin, epoxy resin, unsaturated polyester resin, diallyl phthalate or mixtures thereof. The resin composition may, for example, be applied at a coverage between ≥5 g/m2 and ≤40 g/m2, preferably ≥10 g/m2 and ≤30 g/m2. Further, a paper or non-woven fabric with a grammage between ≥30 g/m2 and ≤80 g/m2, preferably between ≥40 g/m2 and ≤70 g/m2 may be applied onto the plate-shaped carrier.

Furthermore, according to method step h) a decoration reproducing a decorative template may be applied on at least a portion of the carrier. In this case, the decoration may be applied by so-called direct printing. The term "direct printing" in the sense of the disclosure means the application of a decoration directly onto the carrier of a panel or onto an unprinted fiber material layer applied to the carrier or a decoration subsurface. Here, different printing techniques such as flexographic printing, offset printing or screen printing may be used. In particular digital printing techniques such as inkjet processes or laser printing processes can be used.

For example, to mimic or reproduce a decorative template in a particularly detailed and highly accurate three-dimensional form, the decoration can be applied template identical. In particular, three-dimensional decoration data may be provided by three-dimensionally scanning the decorative template by means of electromagnetic radiation, for example, by a three-dimensional scanner (3D scanner). Here, a plurality of decorative layers with at least partially different surface application amount may be applied successively on the basis of the three-dimensional decoration data.

Moreover, the decorative layers may be formed of an in particular radiation curable paint and/or ink. For example, a UV-curable paint or ink can be used. In this embodiment a particularly detailed and matching reproduction of the decorative template can be achieved. In this way a synchronous pore can be obtained highly accurate without the provision of further measures. A synchronous pore may in particular be a pore or another type of structure, which is located spatially exactly where it is displayed visually and is obtained by means of haptic patterning in correspondence with the visual decorative features. In this embodiment this is substantially automatically the case, because the structural design is generated by the paint or ink. In addition, decorative templates, such as wood-based materials, often have a variation of the color impression not only along their width or length but also along their depth. This color impression or color gradient, too, can be replicated particularly detailed in this embodiment, which also lets the overall impression of the panel appear even more identical. In this case, in particular when the used paint or ink is radiation curable, a particularly rapid solidification can be achieved, such that the plurality of layers may be applied in rapid succession, such that the entire process can be realized in a short time, and thus particularly cost-efficient.

The term radiation curable paint in the sense of the disclosure means a binder and/or filler and pigments containing composition which induced by electromagnetic radiation of a suitable wavelength, such as UV radiation or electron radiation can be at least partially polymerized.

The term radiation curable ink in the sense of the disclosure means a substantially filler free color pigments containing composition which induced by electromagnetic radiation of suitable wavelength, such as ultraviolet radiation or electron radiation can be at least partially polymerized.

Here, the decorative layers can be applied respectively to a thickness in a range of ≥5 μm to ≤10 μm.

It can also be provided to apply in addition to a positive image with regard to the color and/or texture also a corresponding negative image of the decorative template. In detail, as is known, for example, from positive staining or negative staining of wood-based materials the color impression for example of a grain can be reversed by the use of digital data, such that a negative is obtained with respect to the color or in particular lighter and darker areas. In addition to the color impression corresponding results can also be obtained for the applied structure, such that also with respect to the structural design a negative can be realized. Even such effects can be integrated easily based on digital three-dimensional and without lead-time or refittings in a manufacturing process.

According to method step i) a protective layer can be applied onto at least a portion of the decoration. Such a layer for protecting the applied decoration can in particular be applied as wearing or top layer on top of the decorative layer in a subsequent method step which in particular protects the decorative layer from wear or damage caused by dirt, moisture, or mechanical impacts, such as abrasion. For example, it may be provided that the wearing and/or top layer is laid as a pre-produced overlay layer, such as based on melamine, onto the printed carrier and bonded to it by pressure and/or heat impact. Moreover, it may be preferred that for the formation of the wear and/or top layer also a radiation curable composition, such as a radiation curable lacquer, e.g. an acrylic lacquer, is applied. Herein, it may be provided that the wearing layer includes hard materials such as titanium nitride, titanium carbide, silicon nitride, silicon carbide, boron carbide, tungsten carbide, tantalum carbide, alumina (corundum), zirconia or mixtures thereof in order to increase the wear resistance of the layer. In this case, the application can be realized for example by means of rollers, such as rubber rollers, or pouring devices.

Furthermore, the top layer can be initially partially cured and subsequently a final coating process with a urethane acrylate and a final curing process, such as by use of a gallium emitter, may be carried out.

Moreover, the top and/or the wearing layer may include agents for reducing the static (electrostatic) charging of the final laminate. To this end, for example, it may be provided that the top and/or wearing layer comprise compounds such as choline chloride. The antistatic agent may, for example, be contained in a concentration between ≥0.1 wt.-% and ≤40.0 wt.-%, preferably between ≥1.0 wt.-% and ≤30.0 wt.-% in the composition for forming the top and/or wearing layer.

Moreover, according to method step j) it can be provided that in the protective layer or in the wearing or top layer a structuring, in particular a surface structure matching with the decoration is formed by introducing pores. Herein, it may be provided that the carrier plate already has a structure and an alignment of a printing tool for applying the decoration and the carrier plate relative to each other is carried out depending on the structure of the carrier plate detected by optical methods. For aligning the printing tool and the carrier plate relative to each other it can be provided that a relative movement between the printing tool and the carrier plate necessary for the alignment process is carried out by a displacement of the carrier plate or by a displacement of the printing tool. Furthermore, it may be provided that a structuring of the decorative panels is implemented after the application of the top and/or wearing layer. For this purpose, it may be preferably provided that as a top and/or wearing layer a curable composition is applied and a curing process is carried out only to the extent that only a partial curing of the top and/or wearing layer occurs. In the thus partially cured layer a desired surface structure is embossed by means of suitable tools, such as a hard metal structure roller or a die. The embossing process is carried out in accordance with the applied decoration. In order to ensure a sufficient matching of the structure to be introduced with the decoration it may be provided that the carrier plate and the embossing tool are aligned relative to each other by corresponding relative movements. Subsequently to the introduction of the desired structure into the partially cured top and/or wearing layer a further curing process of the now structured top and/or wearing layer is carried out.

In many cases it is envisaged that in such a wearing or top layer a decorative surface structure coinciding with the decoration is introduced. A surface structure coinciding with the decoration means that the surface of the decorative panel has a haptically perceptual structure, which with respect to its shape and pattern corresponds to the applied decoration, in order to obtain a reproduction of a natural material as close to the original as possible even with respect to the haptic.

In addition, a backing layer can be applied onto the side opposite to the decorative side. Herein, it is particularly preferred that the backing layer is applied in a common calendering step together with the application of the paper or non-woven fabric onto the decorative side.

Alternatively or additionally the edge regions of the panel can be structured or provided with a profile in order to provide in particular releasable connecting elements. In this regard, in profiling in the sense of the disclosure it may be provided that by means of suitable material removing tools a decorative and/or functional profile is introduced at least in a part of the edges of the decorative panel. Herein, a functional profile, for example, means the introduction of a groove and/or tongue profile in an edge in order to make decorative panels connectable to each other by means of the introduced profiles. In particular with groove and/or tongue profiles elastic materials are advantageous because by these alone profiles can be produced which are particularly easy to handle and stable. Thus, in particular no additional materials are needed to produce the connecting elements.

The method described above enables an improved production of a wall panel or a floor panel.

In particular, the carrier material may be selected arbitrarily and in particular carrier materials may be used which may have particularly advantageous properties for the panel to be produced. For example, particularly high quality panels may be produced which can satisfy the highest requirements regarding appearance and stability. Thus, a production can be particularly effective and cost-efficient.

The method applicable to the method for producing a wall and a floor panel for producing a carrier may be advantageous in particular in the context of the present method according to the disclosure for producing wall and floor panels, since it allows particularly high line speeds well in excess of the line speeds known from the prior art as a feed rate of the carrier or of the conveying means for the production of a panel. Herein, by use of a twin belt press line speeds of up to 15 m/min can be achieved, wherein values of 6 m/min or more may be possible even for materials which are problematic in this regard.

Moreover, by means of the above described two-stage compression process a very precise thickness in particular for carrier materials of panels can be achieved, wherein for example thickness tolerances in a range of 0.1 mm or less can be achieved. Thus, a carrier produced by the method described above in addition to a particularly homogeneous composition further may comprise a particularly uniform thickness, which enables a particularly defined and reproducible product and thus a particularly high quality.

Furthermore, it was found that in particular by the above described method very stable carriers can be produced, which can be further improved with respect to the stability.

According to one embodiment a carrier material based on a plastic or a wood plastic composite material (WPC) can be provided. For example, the carrier plate can be formed from a thermoplastic, elastomeric or duroplastic plastic material. In addition, recycling materials from the abovementioned materials can be used in the context of the method according to the disclosure. Here, as a plate material in particular thermoplastic plastics, such as polyvinyl chloride, polyolefins (for example polyethylene (PE), polypropylene (PP), polyamides (PA), polyurethane (PU), polystyrene (PS), acrylonitrile-butadiene-styrene (ABS), polymethyl methacrylate (PMMA), polycarbonate (PC), polyethylene terephthalate (PET), polyetheretherketone (PEEK)) or mixtures or co-polymers thereof may be preferred. In this case, irrespective of the base material of the carrier, for example, plasticizers may be present in a range of >0 wt.-% to ≤20 wt.-%, in particular ≤10 wt.-%, preferably ≤7 wt.-%, for example in a range of ≥5 wt.-% to ≤10 wt.-%. A suitable plasticizer comprises for example the plasticizer sold under the trade name "Dinsch" by the company BASF. Further as a substituent for conventional plasticizers copolymers such as acrylates or methacrylates may be provided. Moreover, within or upstream of the twin belt press in this embodiment the carrier can be cooled down to a temperature below the melting point of the plastic component.

In particular, thermoplastics offer the advantage that the products made from them can be easily recycled. It is also possible to use recycling materials from other sources. This offers a further possibility to reduce the manufacturing costs.

Such carriers are very elastic or resilient which allows a comfortable feeling when walking and also enables to reduce the noise occurring during walking compared to conventional materials, so that an improved footstep sound insulation can be realized.

In addition, the aforementioned carriers offer the advantage of good water resistance, because they have a degree of swelling of 1% or less. This in a surprising way besides pure plastic carriers also applies to WPC materials, as is explained in detail below.

In a particularly advantageous manner the carrier material may comprise wood-polymer materials (Wood Plastic Composite, WPC) or consist thereof. Here, as an example a wooden material and a polymer may be suitable, which can be present in a ratio of 40/60 to 70/30, such as 50/50. As polymeric components polypropylene, polyethylene or a copolymer of the two aforementioned materials can be used, and wherein further wood flour may be used as a wooden component. Such materials offer the advantage that they can be already formed to a carrier at low temperatures, such as in a range of ≥180° C. to ≤200° C., in the process described above such that a particularly effective process control with exemplary line speeds in a range of 6 m/min is enabled. For example, for a WPC product with a ratio of 50/50 of the wooden material and the polymer components an exemplary product thickness of 4.1 mm is possible, which allows a particularly effective manufacturing process.

Further, in this way very stable panels can be produced which moreover have a high elasticity which may in particular be advantageous for an effective and cost-efficient configuration of connecting elements at the edge region of the carrier and further with respect to a footstep sound insulation. Furthermore, the aforementioned good water tolerance with a degree of swelling of less than 1% is enabled in such WPC materials. Herein, WPC materials may, for example, comprise stabilizers and/or other additives which preferably may be present in the plastic component.

Furthermore, it may be particularly advantageous that the carrier material comprises a PVC-based material or consists thereof. Even such materials can be used in a particularly advantageous manner for high quality panels that may be used in wet rooms without any problems. Furthermore, also PVC-based carrier materials offer themselves for a particularly effective manufacturing process, since here line speeds of 8 m/min at an exemplary product thickness of 4.1 mm are possible, which enables a particularly effective manufacturing process. Moreover, even such carriers have an advantageous elasticity and water tolerance which can lead to the aforementioned advantages.

For plastic-based panels as well as in WPC-based panels mineral fillers may be of advantage. Here, talc or calcium carbonate (chalk), aluminum oxide, silica gel, silica flour, wood flour and gypsum are particularly suitable. For example, chalk may be provided in a range of ≥30 wt.-% to ≤70 wt.-%, wherein by means of fillers, in particular by means of chalk, in particular the slip of the carrier can be improved. Moreover, they can be colored in a known manner. In particular, it can be provided that the plate material comprises a flame retardant.

According to a particularly preferred embodiment of the disclosure the carrier material consists of a mixture of a PE/PP block copolymer and wood. Herein, the proportion of the PE/PP block copolymer and the proportion of wood can range between ≥45 wt.-% and ≤55 wt.-%. Furthermore, the carrier material can comprise between ≥0 wt.-% and ≤10 wt.-% of other additives such as flow agents, heat stabilizers or UV stabilizers. Here, the particle size of the wood is between >0 μm and ≤600 μm with a preferred particle size distribution of D50≥400 μm. In particular, the carrier material may comprise wood with a particle size distribution of D10≥400 μm. The particle size distribution is based on the volumetric diameter and refers to the volume of the particles. Particularly preferably the carrier material is provided as granular or pelletized pre-extruded mixture of a PE/PP block copolymer and wood particles with the specified particle size distribution. Here, the granules and/or pellets can preferably have a particle size in the range of ≥400 μm to ≤10 mm, preferably ≥600 μm to ≤10 mm, in particular ≥800 μm to ≤10 mm.

For example, the carrier material may be present in the form of granules and may have a cylindrical shape. Moreover, irrespective of the shape the granule particles, for example in the cylindrical shape, may have a diameter in the range of 2-3 mm, such as 2 or 3 mm, and a length of 2-9 mm, such as 2-7 mm or 5-9 mm.

According to a further preferred embodiment of the disclosure the carrier material consists of a mixture of a PE/PP polymer blend and wood. Here, the proportion of PE/PP polymer blend as well as the proportion of wood can be in a range between ≥45 wt.-% and ≤55 wt.-%. Furthermore, the carrier material can comprise between ≥0 wt.-% and ≤10 wt.-% of other additives such as flow agents, heat stabilizers or UV stabilizers. Here, the particle size of the wood is between >0 μm and ≤600 μm with a preferred particle size distribution of D50≥400 μm. In particular, the carrier material may comprise wood with a particle size distribution of D10≥400 μm. The particle size distribution is based on the volumetric diameter and refers to the volume of the particles. Particularly preferably, the carrier material is provided as a granular or pelletized pre-extruded mixture of a PE/PP polymer blend and wood particles with the specified particle size distribution. Here, the granules and/or pellets can preferably have a particle size in a range of ≥400 μm to ≤10 mm, preferably ≥600 μm to ≤10 mm, in particular ≥800 μm to ≤10 mm.

In a further embodiment of the disclosure, the carrier material consists of a mixture of a PP homopolymer and wood. The proportion of the PP homopolymer and the proportion of wood can be in a range between ≥45 wt.-% and ≤55 wt.-%. For example, the constituents wood and polypropylene may be present in a ratio of 0.5:1 to 1:0.5, such as 1:1. Furthermore, the carrier material can comprise between ≥0 wt.-% and ≤10 wt.-% of other additives, such as flow agents, heat stabilizers or UV stabilizers. Here, the particle size of the wood is between >0 μm and ≤600 μm with a preferred particle size distribution of D50≥400 μm. In particular, the carrier material can comprise wood with a particle size distribution of D10≥400 μm. The particle size distribution is based on the volumetric diameter and refers to the volume of the particles. Particularly preferably the carrier material is provided as a granular or pelletized pre-extruded mixture of a PP homopolymer and wood particles of the specified particle size distribution. The granules and/or pellets can preferably have a particle size in the range of ≥400 μm to ≤10 mm, preferably ≥600 μm to ≤10 mm, in particular ≥800 μm to ≤10 mm.

In another embodiment of the disclosure, the carrier material consists of a mixture of a PVC polymer and chalk. Herein, the proportion of the PVC polymer and the proportion of chalk can be in a range between ≥45 wt.-% and ≤55 wt.-%. Furthermore, the carrier material can comprise between ≥0 wt.-% and ≤10 wt.-% of other additives, such as flow agents, heat stabilizers or UV stabilizers. The particle size of the chalk is between >0 μm and ≤1000 μm, for example between ≥800 μm and ≤1000 μm, with a preferred particle size distribution of D50≥400 μm, for example ≥600 μm. In particular, the carrier material may comprise chalk with a particle size distribution of D10≥400 μm, for example ≥600 μm. The particle size distribution is based on the volumetric diameter and refers to the volume of the particles. Particularly preferably the carrier material is provided as a granular or pelletized pre-extruded mixture of a PVC polymer with chalk with the specified particle size distribution. The granules and/or pellets can preferably have a particle size in the range of ≥400 μm to ≤10 mm, preferably ≥600 μm to ≤10 mm, in particular ≥800 μm to ≤10 mm, such as ≥1000 μm to ≤10 mm.

In a further embodiment of the disclosure the carrier material consists of a mixture of PVC polymer and wood. Herein, the proportion of the PVC polymer and the proportion of the wood can be in a range between ≥45 wt.-% and ≤55 wt.-%. Furthermore, the carrier material can comprise between ≥0 wt.-% and ≤10 wt.-% of other additives, such as flow agents, heat stabilizers or UV stabilizers. The particle size of the wood is between >0 μm and ≤1000 μm, such as between ≥800 μm and ≤1000 μm, with a preferred particle size distribution of D50≥400 μm, such as ≥600 μm. In particular, the carrier material can comprise wood with a particle size distribution of D10≥400 μm, such as ≥600 μm. The particle size distribution is based on the volumetric diameter and refers to the volume of the particles. Particularly preferably the carrier material is provided as granular or pelletized pre-extruded mixture of a PVC polymer and wood particles of the specified particle size distribution. The granules and/or pellets can preferably have a particle size in the range of ≥400 μm to ≤10 mm, preferably ≥600 μm to ≤10 mm, in particular ≥800 μm to ≤10 mm, such as ≥1000 μm to ≤10 mm.

For determining the particle size distribution well-known methods such as laser diffractometry can be used, by means of which particle sizes in the range from a few nanometers up to several millimeters can be determined. Using this method also D50 or D10 values can be determined, according to which 50% and 10%, respectively, of the measured particles are smaller than the specified value.

According to another embodiment the carrier material may comprise hollow microspheres. This kind of additives can in particular cause that the density of the carrier and thus of the produced panel can be significantly reduced, such that a particularly simple and cost-effective transportation and also a very comfortable laying can be ensured. Herein, in particular by the insertion of hollow microspheres a stability of the produced panel can be ensured which is not significantly reduced compared to a material without hollow microspheres. Thus, the stability is sufficient for most applications. Herein, hollow microspheres can be understood in particular as structures, which have a hollow basis body and a size or a maximum diameter in the micrometer range. For example, usable hollow spheres may have a diameter in the range of ≥5 m to ≤100 μm, such as ≥20 μm to ≤50 μm. As a material of the hollow microspheres basically any material comes into consideration, such as glass or ceramic. Further, due to the weight plastics, such as the plastics used in the carrier material, such as PVC, PE or PP can be advantageous, wherein these optionally can be prevented from deforming during the manufacturing process by suitable additives.

According to a further embodiment the belt-like conveying means may be at least partially structured. By the use of structured conveying means a carrier can be produced which is also structured and thus, for example, may comprise pores, which, for example, can reflect a natural product to be replicated. In this way any further structuring in the subsequent production process of the panel can be dispensed with, which can make the subsequent processing steps particularly simple, quick and cost-efficient. In addition, the structure or the pores in this embodiment can be realized in one method step together with the forming of the web-shaped carrier, such that a further method step for forming the pores can be dispensed with. Furthermore, the formed structure, because it is already present in the carrier and thus in the core of the panel, can be particularly stable and durable even at extreme stresses. In addition to the introduction of a structure, the belts of the conveying means can also have a defined roughness, since in this way a venting during the forming of the carrier can be improved. Herein, for example, different surface roughnesses may be used for the upper and the lower belt, wherein the lower belt can have a greater roughness depth than the upper belt or belt-like conveying means. For example, the lower belt and/or the upper belt can have a roughness depth in the range from ≥0 to ≤25 μm.

According to a further embodiment a sensor for verifying the placement of the carrier material between the two belt-like conveying means can be provided. In particular, the sensor can detect the placement of the carrier material on the lower conveying means. For example, a sensor in particular based on X-rays may be provided that verifies the basis weight of the deposited material and thus the homogeneity of the deposited material. Preferably, the sensor may include a feedback to the scattering units in order to be able to respond directly to a faulty deposition. Herein, the sensor can be shielded by respective protective sheets in order to prevent an unwanted leakage of X-rays. Moreover, a cooling system can be provided for protecting and increasing the lifetime of the sensor.

According to a further embodiment a fiber material may be incorporated into the carrier. In particular, the fiber material can be incorporated into the carrier in method step b). In this embodiment therefore a fiber material, in particular a fiber material web can be wound onto a coil and unwound by an unwinding station for unwinding the fiber material and supplied between the two belt-like conveying means in order to insert the fiber material. For example, in this embodiment a glass fiber mat can be used. In this embodiment a carrier with a particularly high strength or stability can be produced since the strength of the carrier can be increased significantly by means of the incorporated fiber material. Moreover, in this embodiment the carrier can be particularly tailored, because, for example, by providing a plurality of scattering units, as explained above in detail, the carrier material, for example, can be adjusted above and below the mat or non-woven fabric as desired. Moreover, a solution which enables an even better tailoring, can be realized by providing a plurality of fiber material webs, wherein the carrier material again may be varied or adjusted as desired.

According to a further embodiment a temperature gradient can be set in method step c). In particular, a temperature gradient can be set along a conveying direction of the carrier material. In this embodiment this method step enables a particularly high quality product and moreover a particularly high line speed. In detail, by using a temperature gradient along a conveying direction, for example, a particular rapid heating-up can be realized, which allows for a high line speed. This, for example, can be realized by a relative higher temperature in a first or leading region in the direction of conveyance. Herein, moreover, a too high temperature impact onto the carrier material can be prevented, which prevents damages and enables a particularly high quality. Moreover, a degassing during heating of the carrier material can be improved and accelerated, which in turn allows for a high line speed and also a particularly high stability and quality through the prevention of gas inclusions. This can in particular be facilitated by a temperature gradient in a direction perpendicular to the conveying direction. In the latter case, in particular the region below the carrier material can be heated to a higher temperature than the region above the carrier material. Here, for example, a temperature gradient in the range of 50° C. may be advantageous.

According to a further embodiment method step c) may be carried out by use of two plate-shaped forming means. In this embodiment a particularly long processing time and forming of the carrier can be implemented even at high line speeds, which allows for a particularly defined forming of the carrier. In particular in this embodiment by means of a long contact time of the carrier material with the plate-shaped forming means, which can be correspondingly heatable, the carrier material can be heated easily to a desired and required temperature even at high line speeds. In addition, this embodiment also allows for the formation of temperature profiles in a particularly easy and effective way.

According to a further embodiment method step d) may be performed by use of a S-roller. By using a S-roller as a compression unit a desired compression is possible in a defined way with simple and inexpensive means even at high line speeds. In order to be able to set the corresponding and depending on the desired result appropriate force the roller can be shiftable, for example, in the direction perpendicular to the passing carrier material. Herein, the S-roller may, for example, comprise only a single roller, which exerts a force only in combination with a counter-force generated by the belt tension of the conveying means. Alternatively, one or a plurality of counter rollers may be provided, which apply the corresponding counter force. A S-roller in the sense of the disclosure means a roller, which is arranged such that the carrier passes it in a S-shaped path as is well known to those skilled in the art and is described in detail below with reference to the figures.

According to a further embodiment in method step e) the carrier can be compressed by a factor of >0% to ≤7%, preferably >0% to ≤5%. Thus, in this embodiment in method step e) by means of a slight compression a particularly smooth surface can be obtained, since this method step can be substantially adapted to the smoothing or setting of the surface quality. Thus, the entire set-up of the press, in particular of the twin belt press, can be optimized to smoothing and no focus has to be laid on an excessive compression, such that even at high throughputs a particularly good surface appearance can be obtained.

According to a further embodiment the carrier may be heated to a temperature above the crystallization temperature of a plastic material present in the carrier after method step e) in particular immediately after method step e) and/or, for example, prior to the application of further layers onto the carrier. Subsequently the carrier may again be cooled down below the crystallization temperature, such as to room temperature (22° C.). In particular, when the carrier is again heated to a temperature above the crystallization temperature of the plastic material contained in the carrier material and possibly is above the crystallization temperature of the plastic material of the film of the moisture-controlling material after the treatment of the carrier under the influence of pressure by use of a twin belt press the properties of the carrier may be improved even further. For example, the carrier may comprise improved stability characteristics, in particular with respect to its mechanical and/or thermal and/or chemical resistance. Thus, the quality of the carrier can be further improved.

This embodiment is in particular applicable in the presence of partially crystalline and/or thermoplastic polymers in the carrier material or in the film, such as of polyethylene or polypropylene. The crystallization temperature in the sense of the present disclosure is in particular the temperature to which the polymer has to be heated in order to subsequently form crystals during cooling. In particular, the crystal formation begins during the cooling of the polymer at a temperature which is below the melting temperature and possibly above the glass transition temperature. Correspondingly, a heating to a temperature below the melting temperature of the respective plastic material or to a temperature below the melting temperature may be sufficient. In the case of linear polyethylene (LLDPE), for example, a heating to a temperature in a range of $\geq 100°$ C. to $\leq 150°$ C., such as $120°$ C., may be sufficient. In the case of polypropylene, for example, a heating to a temperature in a range of $\geq 160°$ C. to $\leq 200°$ C., such as $180°$ C., may be sufficient.

The duration of the corresponding heating process may thus depend on the transfer speed of the carrier, from its thickness and from the temperature to be set in a way obvious to a person skilled in the art.

Regarding further technical features and advantages of the method it is hereby explicitly referred to the description of the wall or floor panel as well as to the figures.

Moreover, the disclosure relates to an apparatus for producing a decorated wall or floor panel characterized in that the apparatus comprises means for performing a method configured as described above. With respect to the provision of corresponding means and their advantages it is explicitly referred to the description of the method, the wall or floor panel as well as to the figures.

Moreover, the disclosure relates to a wall or floor panel produced according to a method described above, wherein a plate-shaped carrier comprises a profile at least in an edge region. In profiling in the sense of the disclosure it is provided that by means of suitable cutting tools at least in a portion of the edges of the decorative panel a decorative and/or functional profile is produced. Herein, a functional profile, for example, means the formation of a groove and/or tongue profile at an edge in order to enable to connect decorative panels to each other by means of the formed profiles. A decorative profile in the sense of the disclosure, for example, is a chamfer formed at the edge region of the decorative panel, for example, in order to simulate a joint between two interconnected panels, such as for example in so-called wide planks.

By partially profiling the decorative panel not all profiles to be provided in the finished panel are produced, but only part of the profiles, while other profiles are produced in a subsequent step. Thus, it may be provided, for example, that the decorative profile to be provided in a panel, such as a chamfer, is produced in one method step, while the functional profile, e.g. groove/tongue, is produced in a subsequent method step.

By means of the application of the decoration subsequently to the at least partially profiling of the carrier, for example, by means of the above-described methods, such as direct printing, abrasion or damage of the decoration in the course of the profiling process can be avoided in an advantageous way. Thus, the decoration also in the regions of the profile corresponds in detail to the desired imitation, for example, of a natural material.

In order to provide a particular detailed imitation even in the profiled regions the master used for the printing process can be distortion corrected in the region of the profile of the panel. Distortion correction in the sense of the disclosure means, for example, with respect to the exemplary case of the application by means of a printing process, that the distortion of the printed image caused by the deviation of the profiling out of the surface plane of the carrier, for example, at a chamfer edge, is corrected by adapting the master to the deviation. Herein, it may be provided, for example, that the correction of the distortion is implemented by adapting the pixel spacing, the pixel size and/or the ink application depending on the intended edge profile of the finished decorative panel. Herein, in case of printing by means of digital printing the print head can be driven depending on the distortion to be corrected, such that the print head, for example, is deflected beyond the profiled region and the ink discharge is adapted to the profile.

Here, it is e.g. possible that prior to the application of the decorative layer of the carrier provided as a large plate, the joints (such as V-joints) to be provided in the final panel laminate, are milled into the carrier, on the thus profiled carrier at least the decorative layer is applied and subsequently the carrier is cut at least in the profiled areas. Herein, depending on the cutting method, such as sawing, laser or water jet cutting, it may be preferred that the required bleed allowance is taken into account in the produced profile.

For example, the plate-shaped carrier can comprise a material which is based on a WPC material or a PVC material. With respect to the exact composition and the advantages resulting therefrom we explicitly refer to the above description of the method. For example, it may be provided, that the carrier material comprises wood and/or chalk having a particle size between $\geq 0$ and $\leq 1000$ μm, such as between $\geq 800$ and $\leq 1000$ μm, and a particle size distribution D50 of $\geq 400$ m, preferably a particle size distribution D10 of $\geq 400$ μm such as a particle size distribution D50 of $\geq 600$ μm, preferably a particle size distribution D10 of $\geq 600$ μm.

Regarding further technical features and advantages of the wall or floor panel it is hereby explicitly referred to the description of the method and to the figures.

The disclosure is explained below in detail with reference to the figures and an exemplary embodiment.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
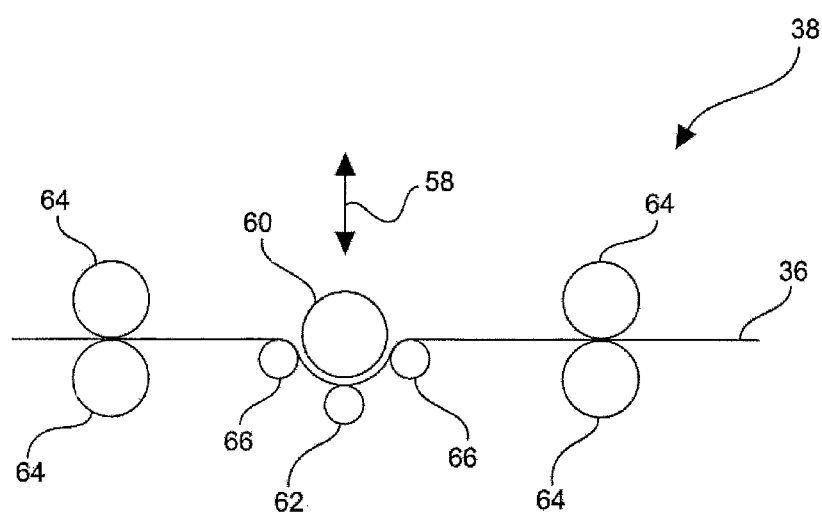

FIG. 1 shows schematically an apparatus according to the disclosure for performing a part of the method according to the disclosure; and FIG. 2 shows an exemplary S-roller for carrying out a method step of the method according to the disclosure.

Corresponding reference numerals indicate corresponding parts throughout the several views of the drawings.

DETAILED DESCRIPTION

Example embodiments will now be described more fully with reference to the accompanying drawings.

The apparatus of FIG. 1 is suitable for a method for producing a decorated wall or floor panel. Here, in particular processing stations for the following method steps are described with respect to FIG. 1:

a) providing a pourable carrier material, in particular a granulate,
b) placing the carrier material between two belt-like conveying means,
c) forming the carrier material under the influence of temperature to form a web-shaped carrier,
d) compressing the carrier,
e) treating the web-shaped carrier under the influence of pressure by use of a twin belt press, wherein the carrier is cooled within or upstream of the twin belt press,
f) optionally further cooling the carrier.

Subsequently to these method steps the method may comprise further method steps in order to obtain the finished wall or floor panel.

The apparatus 10 according to FIG. 1 includes two circumferential belt-like conveying means 12, 14, which are in particularly guided by deflection rollers 16 such that between them an accommodation space 18 for accommodating and processing a provided pourable, in particular granular base material 20, such as on the basis of a plastic material, such as a material comprising PVC, or a wood-plastic composite material, such as a material comprising wood and PP, PE or a block copolymer comprising PP and PE, is formed. The conveying means 12, 14 may at least partially be constructed of polytetrafluoroethylene, for example, be coated therewith. Furthermore, the conveying means 12, 14 may at least partially, and in particular at their side facing to the accommodation space 18, be roughened or structured. Moreover, the conveying means 12, 14 can for example have a width in a range of about 1.5 m.

In order to dispose the carrier material 20 between the belt-like conveying means 12, 14 or in the accommodation space 18 a dispensing unit 22 is provided at one or a plurality of dispensing heads 24 by means of which the carrier material 20 can be arranged on the lower conveying means 14. The dispensing heads 24 may comprise a hopper 25 which applies the carrier material 20 for example onto corresponding scattering rollers 26, whereupon the carrier material 20 can be scattered onto the lower conveying means 14.

In order to ensure a homogeneous application of the carrier material 20 onto the lower conveying means 14 a sensor for checking the placement of the carrier material 20 between two belt-like conveying means 12, 14 may be provided. The sensor may in particular be coupled to the dispensing unit 22 in order to immediately correct a potentially inaccurate filling of the accommodation chamber 18.

In order to enable a particularly homogeneous distribution of the carrier material 20 moreover vibrators may be provided. These may for example act on the lower conveying means 14 and be arranged, for example, below the lower conveying means 14 so that the carrier material 20 is finely dispersed.

In order to prevent an unwanted contamination and a damage of subsequent processing stations, moreover a sensor for detecting metals may be provided, which is adapted to detect unintentionally introduced metal.

Furthermore, a device for introducing a fiber material into the accommodation space 18 and thus in the carrier may be provided. For example, the fiber material may be configured strip-like and can be unwound from a roll. In this case, the fiber material can be located between two dispensing heads 24 e.g. in order to enable to dispose different materials above and below the fiber material. Thus, the fiber material can be introduced, for example, in such a way that a desired amount of carrier material 20 is disposed above and below the fiber material.

In the conveying direction of the conveying means 12, 14, which is indicated by the arrow 13, a forming unit 28 is provided which is adapted to form the carrier material 20 under the action of temperature or heat for fusing the carrier material 20 in order to form a web-shaped carrier 36. For this purpose, the forming unit 28 may comprise two plate-shaped forming means 30, 32 which may be heated by a heating means 34, for example by means of thermal oil. Thereby, the carrier material 20 can be heated until depending e.g. on the melting point of the carrier material 20 or a portion thereof and depending on the material used, such as PVC or WPU material, it has reached a temperature of e.g. ≥180° C. to ≤200° C. For this purpose, the forming unit 28 or the forming means 30, 32 may be heated for example to a temperature of up to 250° C. Herein, one or for setting a temperature gradient a plurality of independently adjustable heating sections can be provided. For example, the entire forming means 30, 32 which e.g. may have a length of several meters, may be heatable, or only a part thereof may be heatable.

Furthermore, the forming unit 28 can in particular have a parallel gap which can be formed by the plate-shaped forming means 30, 32. However, an inlet mouth can be provided at the entrance by means of a conical shape in order to allow an improved inflow of the carrier material 20. The force acting on the carrier material 20 may be in a range from >0 kg/m2 to ≤1 kg/m2. Here, in particular a uniform pressurization without the provision of a pressure profile or a pressure gradient may be provided.

In FIG. 1 it can also be seen that the lower forming means 32 is longer than the upper forming means 30 and also begins upstream of the upper one. In this way it can be achieved that a processing takes place only when the carrier material 20 is already melted or at least partially melted and at least partially softened. This allows a particularly defined forming process.

In the further course in the conveying direction of the conveying units 12, 14 the strip-like carrier 36 is passed through a compression means 38. The compression means 38 may comprise, for example, an S-roller, which is shown in detail in FIG. 2. The S-roller can be movable substantially perpendicular to the surface of the carrier 36 and thus to the advancing direction of the carrier 36, as indicated by the arrow 58, such that the desired pressures can be adjustable in a particularly advantageous way. Furthermore, the compressing means 38 can exert a pressure onto the carrier 36 for example in a range of ≥1 kg/m2 to ≤3 kg/m2. Herein, the S-roller includes a main roller 60, which acts on the web-shaped carrier 36. Under certain circumstances, the belt tension may be sufficient as a counter pressure, however, it is preferred that at least one counter-pressure roller 62 is provided. For a suitable guidance of the web-shaped carrier 36, moreover, two pairs of calender rollers 64 and, optionally deflection rollers 66 may be provided, which may also provide a suitable belt tension. In FIG. 2 it can be seen that the web-shaped carrier 36 is guided about the guide rollers 66 and the main roller 60 in a duplicate S-shape, and it is this kind of guidance that leads to the term S-roller. In detail, the main roller 60 may be wrapped by the web-shaped carrier 36 in a range of about 50% or more. The temperature of the carrier 36 at an entry of the compression means 38 corresponds in particular to the temperature present at the exit of the forming unit 28.

From the compression means 38 the carrier 36 is guided to a further compression means 40. In order to compensate a possible heat loss of the carrier 36 or to heat the carrier 36 further intentionally or to actively cool the carrier 36 another tempering means 42 such as an IR heater or preferably a cooling means can be provided between the compression means 38, 40 in order to cool the carrier 36. Herein, the carrier can also be cooled by a heating means inasfar it transfers a temperature to the carrier which is below the prevailing carrier temperature before the entry into the tempering means 42 but above room temperature.

Returning to the pressing means 40 this advantageously can be a twin belt press, which may have in particular steel belts 44, 46 which may optionally be coated on the side facing to the carrier 36 with polytetrafluorethylene (Teflon), and wherein the belts 44, 46 of the twin belt press may be guided by means of deflection rollers 48, 50. The deflection rollers 48, 50 may, for example, be heated or preferably be cooled such as by means of a thermal oil heater and/or the rollers on the same side of the gap may be disposed at a distance in a range of ≥1 m to ≤2 m, for example 1.5 m, from each other, wherein the belts 44, 46 may have a width in a range of about 1.5 m. According to FIG. 1 the carrier 20 disposed between the conveying means 12, 14, is guided between the deflection rollers 48, 50 and thus between the belts 44, 46, such as in particular steel belts. On the side of the belts 44, 46 opposite to the carrier 36 respective compressing and/or tempering means 52, 54 are provided by means of which the carrier 36 can be cooled. These are adapted both to cool and slightly compress the conveying means 12, 14 and thus the carrier 36. For this purpose air-cooling and a plurality of rollers which enable an intermittent compression can be provided. In this case, a temperature of the belts 44, 46 in a range of ≥150° C. to ≤180° C., such as 170° C. for the upper belt 44 and/or in a range of ≥140° C. to ≤170° C., such as 160° C. for the lower belt 46 can be set. To this end, for example, by means of the tempering means 52, 54 or the plurality of tempering means cooling zones can be provided in the moving direction of the carrier 36 in order to provide a temperature gradient. In this way, for example, a successive cooling is enabled. For example, a first cooling zone can act on the belts 44, 46 which is set in a range of ≥55° C. to ≤85° C., such as at 72° C., and/or a second cooling zone can act on the belts 44, 46 which is set in a range of ≥45° C. to ≤75° C., such as at 62° C., and/or a third cooling zone can act on the belts 44, 46 which is set in a range of ≥15° C. to ≤45° C., such as at 30° C. Preferably the temperature of the carrier in the compression means 40 can be below the melting temperature or the softening temperature of the carrier material or a portion thereof. Furthermore, the pressure acting onto the carrier 36 may be such that the carrier 36 is compressed in step e) by a factor of ≤7.5%, preferably ≤5%, for example in a range of ≥0.1 mm to ≤0.2 mm. The tempering means 52, 54 may occupy substantially the entire region between the deflecting rollers 48, 50, or only an area which is limited along the conveying direction.

The compression means 40 may have a variable pressure profile, such as in a region starting at 6 mm and ending at 4.1 mm, for example starting at 5.9 mm and ending at 5.3 mm, for example with intermediate steps of 5.7 mm and 5.5 mm, or advantageously be configured as an isochoric press.

In the conveying direction downstream of the compression means 40 accordance to FIG. 1 a cooling device 56 is arranged by means of which the carrier may be cooled to a temperature for example in a range of ≤35° C. Herein, the cooling means 56, for example, may be based on water cooling and may have several cooling zones in order to enable a defined cooling by use of precisely adjustable cooling programs. The length of the cooling zone may correspond to the effective length of the compression means 40. Downstream of the cooling device 56 a further cooling belt may be provided.

After these steps the carrier which may have a final thickness in a range of ≥3 mm to ≤5 mm, for example 4.1 mm, can immediately be further processed or stored, such as in the form of a web-shaped carrier 36 or as an already separated plate-shaped carrier.

Furthermore, at least one heating means 57, in the embodiment according to FIG. 1 zwo heating means 57, is provided by means of which the carrier 36 can be heated and which preferably is disposed downstream of the compression means 40 in particular downstream of the twin belt press in the advancing direction of the carrier. In this way it is enabled that the carrier 36 according to method step e) is heated to a temperature above the crystallization temperature of a plastic material present in the carrier 36, wherein subsequently a cooling process may be carried out which, for example, can be realized by use of a further tempering means, such as a cooling means.

At this point, in the method according to the disclosure the further method steps follow:
g) optionally applying a decorative subsurface onto at least a portion of the carrier 36;
h) applying a decoration reproducing a decorative template onto at least a portion of the carrier 36,
i) applying a protective layer onto at least a portion of the decoration,
j) optionally structuring the protective layer, and
k) optionally treating the carrier 36 for electrostatic discharge prior to any of the above steps.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for producing a decorated wall or floor panel, comprising at least the method steps performed in subsequent order:
a) providing a pourable granulate carrier material;
b) placing the carrier material between two belt conveying means;
c) heating the carrier material to a temperature above the melting point or softening point of the carrier material in order to form a web-shaped carrier;
d) compressing the carrier;

e) treating the carrier under the action of pressure by use of a twin belt press, wherein the carrier is cooled within or upstream of the twin belt press;

g) applying a decorative subsurface onto at least a portion of the carrier;

h) applying a decoration reproducing a decorative template onto at least a portion of the carrier;

i) applying a protective layer onto at least a portion of the decoration; and j) optionally structuring the protective layer in order to introduce pores and/or the edge region of the carrier in order to form connecting elements.

2. The method according to claim 1, wherein a carrier material on the basis of a plastic or a wood-plastic composite material is provided.

3. The method according to claim 2, wherein a carrier material based on a WPC material comprising wood and polyethylene, wood and polypropylene or wood and a copolymer of polyethylene and polypropylene or based on a PVC material is provided.

4. The method according to claim 2, wherein the carrier is cooled below the melting point or the softening point of the plastic component in method step e).

5. The method according to claim 1, wherein the carrier material comprises hollow microspheres.

6. The method according to claim 1, wherein the belt conveying means are at least partially structured.

7. The method according to claim 1, wherein a sensor for checking the placement of the carrier material between the belt conveying means is provided.

8. The method according to claim 1, wherein a fiber material, in particular a fiber material web, is incorporated in the carrier.

9. The method according to claim 1, wherein a temperature gradient is set in method step c) or in method step e).

10. The method according to claim 1, wherein method step c) is carried out by use of two plate-shaped forming means.

11. The method according to claim 1, wherein method step d) is carried out by use of a S-roller.

12. The method according to claim 1, wherein the belt-like conveying means each comprise a steel belt coated with polytetrafluorethylene.

13. The method according to claim 1, wherein the carrier comprises a plastic material and the carrier subsequently to method step e) is heated to a temperature above the crystallization temperature of the plastic material present in the carrier.

* * * * *